US011316465B2

(12) United States Patent
Takayama et al.

(10) Patent No.: US 11,316,465 B2
(45) Date of Patent: Apr. 26, 2022

(54) MOTOR DRIVE DEVICE, ELECTRIC BLOWER, ELECTRIC VACUUM CLEANER, AND HAND DRYER

(71) Applicant: Mitsubishi Electric Corporation, Tokyo (JP)

(72) Inventors: Yuji Takayama, Tokyo (JP); Kazunori Hatakeyama, Tokyo (JP); Haruka Matsuo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 6 days.

(21) Appl. No.: 16/970,010

(22) PCT Filed: Mar. 23, 2018

(86) PCT No.: PCT/JP2018/011936
§ 371 (c)(1),
(2) Date: Aug. 14, 2020

(87) PCT Pub. No.: WO2019/180971
PCT Pub. Date: Sep. 26, 2019

(65) Prior Publication Data
US 2021/0111655 A1 Apr. 15, 2021

(51) Int. Cl.
*H02P 27/06* (2006.01)
*H02P 21/22* (2016.01)
*A45D 20/12* (2006.01)
*A47L 9/28* (2006.01)
*H02M 7/00* (2006.01)

(52) U.S. Cl.
CPC .............. *H02P 27/06* (2013.01); *A45D 20/12* (2013.01); *A47L 9/28* (2013.01); *H02M 7/003* (2013.01); *H02P 21/22* (2016.02)

(58) Field of Classification Search
CPC ...... H02P 1/00; H02P 1/04; H02P 1/16; H02P 1/163; H02P 1/18; H02P 1/24; H02P 1/26;
(Continued)

(56) References Cited

U.S. PATENT DOCUMENTS 5,604,672 A 2/1997 Yoshida et al.
8,543,271 B2* 9/2013 Yamamoto .............. B60L 58/15
701/22
(Continued)

FOREIGN PATENT DOCUMENTS

JP H08-85332 A 4/1996
JP 2009-011145 A 1/2009
(Continued)

OTHER PUBLICATIONS

International Search Report of the International Searching Authority dated Jun. 26, 2018 for the corresponding international application No. PCT/JP2018/011936 (and English translation).

*Primary Examiner* — Antony M Paul
(74) *Attorney, Agent, or Firm* — Posz Law Group, PLC

(57) ABSTRACT

A motor drive device includes a single-phase inverter that converts a direct-current voltage output from a power supply which is a battery, into an alternating-current voltage. The inverter outputs the alternating-current voltage as an applied voltage to be applied to a motor. The applied voltage is lower when the direct-current voltage is a second voltage lower than a first voltage than when the direct-current voltage is the first voltage. Consequently, a discharge current of the battery is reduced, and the motor drive device capable of reducing an increase in battery temperature can be obtained.

9 Claims, 12 Drawing Sheets

(58) Field of Classification Search
CPC .. H02P 1/42; H02P 1/423; H02P 1/426; H02P 1/54; H02P 3/00; H02P 3/06; H02P 3/065; H02P 3/12; H02P 3/14; H02P 3/18; H02P 3/23; H02P 6/00; H02P 6/005; H02P 6/006; H02P 6/04; H02P 6/12; H02P 6/153; H02P 6/24; H02P 6/26; H02P 6/28; H02P 7/00; H02P 7/04; H02P 8/24; H02P 9/00; H02P 9/305; H02P 21/00; H02P 21/0003; H02P 21/14; H02P 21/18; H02P 21/22; H02P 23/0004; H02P 23/07; H02P 23/14; H02P 25/03; H02P 25/062; H02P 27/00; H02P 27/04; H02P 27/06; H02P 27/08; H02P 27/085; H02P 2203/00; H02P 2201/07; H02P 2201/11

See application file for complete search history.

(56) References Cited

U.S. PATENT DOCUMENTS

| | | | |
|---|---|---|---|
| 8,571,734 B2 * | 10/2013 | Yamamoto | B60L 50/61 701/22 |
| 8,624,426 B2 * | 1/2014 | Kato | B60K 6/445 307/9.1 |
| 8,810,052 B2 * | 8/2014 | Kishibata | B60L 15/025 290/38 R |
| 9,114,698 B2 * | 8/2015 | Amano | B60L 3/0007 |
| 9,667,169 B2 * | 5/2017 | Nawa | H02M 7/48 |
| 9,744,876 B2 * | 8/2017 | Sato | H02M 1/36 |
| 10,283,460 B2 * | 5/2019 | Bu | H01L 29/8613 |
| 2008/0297090 A1 | 12/2008 | Takeuchi | |
| 2011/0273126 A1 | 11/2011 | Takeuchi | |
| 2012/0055727 A1 * | 3/2012 | Omiya | B60W 10/26 180/279 |
| 2015/0022139 A1 | 1/2015 | Yamanaka | |

FOREIGN PATENT DOCUMENTS

| | | |
|---|---|---|
| JP | 5062440 B2 | 10/2012 |
| JP | 5541332 B2 | 7/2014 |
| JP | 2015-023703 A | 2/2015 |
| JP | 2016-220474 A | 12/2016 |
| JP | 6135216 B2 | 5/2017 |

* cited by examiner

MOTOR DRIVE DEVICE, ELECTRIC BLOWER, ELECTRIC VACUUM CLEANER, AND HAND DRYER

CROSS REFERENCE TO RELATED APPLICATION

This application is a U.S. national stage application of International Patent Application No. PCT/JP2018/011936 filed on Mar. 23, 2018, the disclosure of which is incorporated herein by reference.

TECHNICAL FIELD

The present invention relates to a motor drive device that drives a motor, and an electric blower, an electric vacuum cleaner, and a hand dryer that include the motor drive device.

BACKGROUND

Patent Literature 1 discloses a technique for changing a voltage applied to a motor from a motor drive control circuit in correspondence to the type of the motor, and keeping the voltage applied to the motor constant.

PATENT LITERATURE

Patent Literature 1: Japanese Patent No. 5541332

For the technique disclosed in Patent Literature 1, a voltage command is controlled such that the voltage command is constant in an attempt to keep the voltage applied to the motor constant. Such control for keeping the voltage command constant proses a problem, for example, in a case where a power supply source of the motor is a battery. More specifically, when a remaining capacity of the battery is reduced and an output voltage of the battery is decreased, a discharge current of the battery increases. The increase in the discharge current causes an increase in temperature of the battery, which results in deterioration of the performance of the battery and shorter life of the battery.

SUMMARY

The present invention has been made in view of the above, and an object thereof is to obtain a motor drive device capable of reducing an increase in battery temperature.

In order to solve the above problem and to achieve the object, a motor drive device according to the present invention comprises an inverter converting a direct-current voltage output from a battery into an alternating-current voltage, and outputting the alternating-current voltage as an applied voltage, the applied voltage being applied to a motor. The applied voltage is lower when the direct-current voltage is a second voltage lower than a first voltage than when the direct-current voltage is the first voltage.

The motor drive device according to the present invention achieves an effect that the increase in battery temperature can be reduced.

DETAILED DESCRIPTION

Hereinafter, a motor drive device, an electric blower, an electric vacuum cleaner, and a hand dryer according to an embodiment of the present invention will be described in detail with reference to the drawings. The present invention is not limited to the embodiment.

Embodiment

Figure 1:
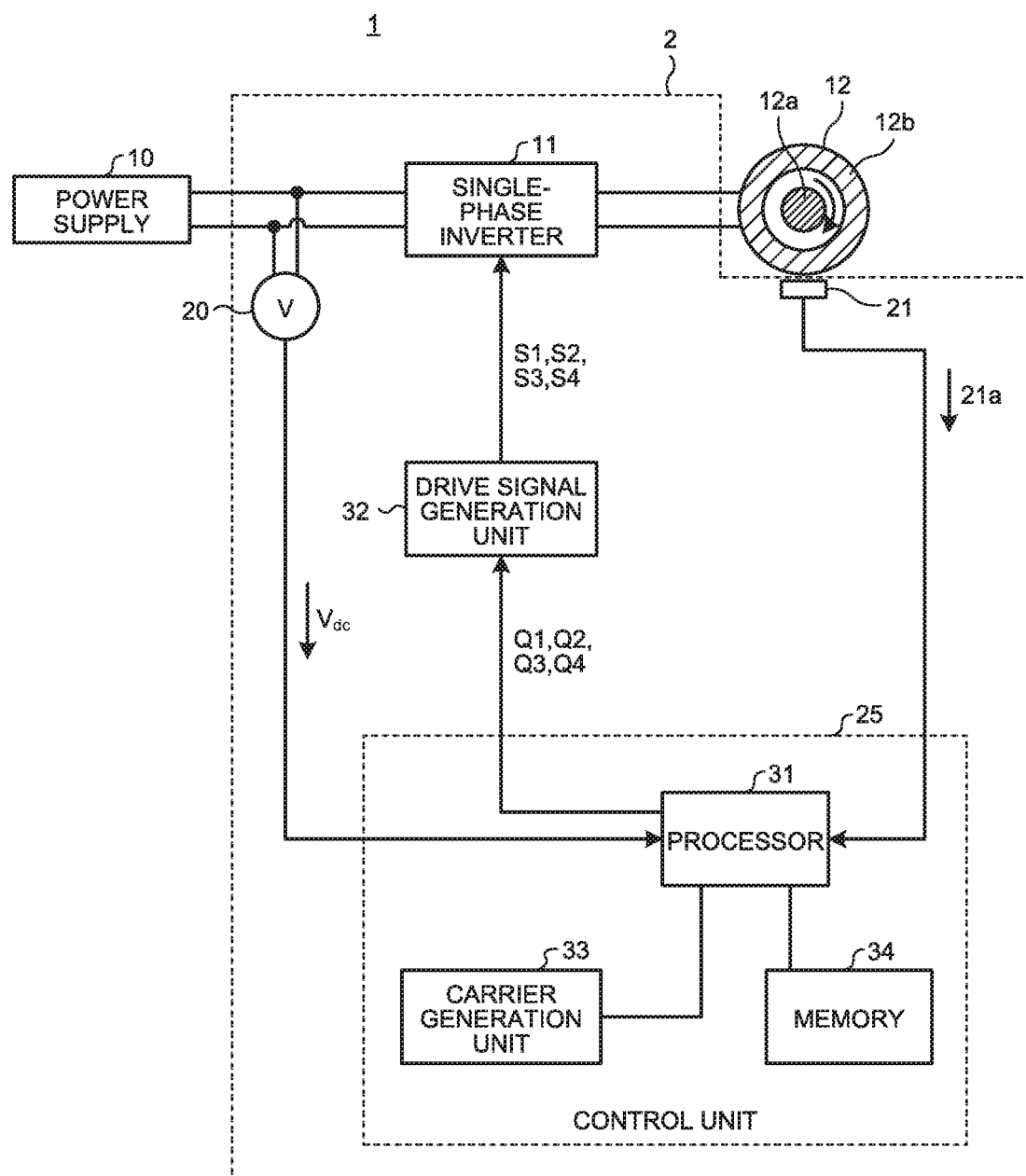
FIG. 1 is a diagram illustrating a configuration of a motor drive system including a motor drive device according to an embodiment of the present invention.

FIG. 1 is a diagram illustrating a configuration of a motor drive system including a motor drive device according to an embodiment of the present invention. A motor drive system 1 according to the embodiment of the present invention includes a power supply 10, a motor drive device 2, and a single-phase motor 12.

The power supply 10 is a battery that supplies direct-current power to the motor drive device 2.

The single-phase motor 12 is a brushless motor including a rotor 12a of a permanent magnet type and a stator 12b. The single-phase motor 12 may be any permanent magnet type motor that generates an induced voltage, and is not limited to the brushless motor. Four permanent magnets are arranged on the rotor 12a in a circumferential direction. These permanent magnets are arranged such that directions of magnetic poles thereof are alternately inverted in the circumferential direction, and form a plurality of magnetic poles of the rotor 12a. The number of permanent magnets is not limited to four, and is only required to be four or more. A winding (not illustrated) is wound around the stator 12b. A motor current flows through the winding. The motor current is equal to an alternating current supplied from a single-phase inverter 11 to the single-phase motor 12.

The motor drive device 2 is a device that supplies alternating-current power to the single-phase motor 12 to drive the single-phase motor 12. The motor drive device 2 includes a voltage sensor 20, a position sensor 21, the single-phase inverter 11, a control unit 25, and a drive signal generation unit 32.

The voltage sensor 20 detects a direct-current voltage $V_{dc}$ output from the power supply 10. The voltage sensor 20 may detect a voltage applied to an input end of the motor drive device 2, or may detect a direct-current voltage applied to a wiring connected to an output end of the power supply 10.

The position sensor 21 detects a rotor rotational position, which is a rotational position of the rotor 12a, and outputs information on the detected rotational position as a position sensor signal 21a. The position sensor signal 21a is a signal that has a potential of one of two values, i.e., a high level or a low level depending on a direction of a magnetic flux generated from the rotor 12a.

The single-phase inverter 11 is a power converter having a direct-current/alternating-current conversion function of converting a direct-current power supplied from the power supply 10, into an alternating-current power and applying the alternating-current voltage to a motor.

The control unit 25 generates PWM signals Q1, Q2, Q3, and Q4 on the basis of the direct-current voltage $V_{dc}$ and the position sensor signal 21a output from the position sensor 21. Hereinafter, the PWM signals Q1, Q2, Q3, and Q4 may be simply referred to as PWM signals.

The drive signal generation unit 32 amplifies the PWM signals output from the control unit 25 and outputs the amplified signals as drive signals S1, S2, S3, and S4 for driving switching elements in the single-phase inverter 11. The drive signals S1, S2, S3, and S4 are signals obtained by amplifying the PWM signals Q1, Q2, Q3, and Q4, respectively.

The control unit 25 includes a processor 31, a carrier generation unit 33, and a memory 34. The processor 31 is a processing unit that performs various calculations regarding PWM control and advance angle control. Details of the PWM control and the advance angle control will be described later. As the processor 31, a central processing unit (CPU, also referred to as a central processing device, a processing device, an arithmetic device, a microprocessor, a microcomputer, a processor, or a digital signal processor (DSP)), or system large scale integration (LSI) can be exemplified.

As the memory 34, a nonvolatile or volatile semiconductor memory such as a random access memory (RAM), a read only memory (ROM), a flash memory, an erasable programmable read only memory (EPROM), or an electrically erasable programmable read-only memory (EEPROM (registered trademark)) can be exemplified. The memory 34 is not limited thereto, and may be a magnetic disk, an optical disk, a compact disc, a mini disk, or a digital versatile disc (DVD). The memory 34 stores a program read by the processor 31. The memory 34 is used as a work area when the processor 31 performs an arithmetic process. A function of the carrier generation unit 33 illustrated in FIG. 1 may be implemented by a processor that executes a dedicated program stored in the memory 34, or may be implemented by dedicated hardware. Details of a configuration of the carrier generation unit 33 will be described later.

Figure 2:
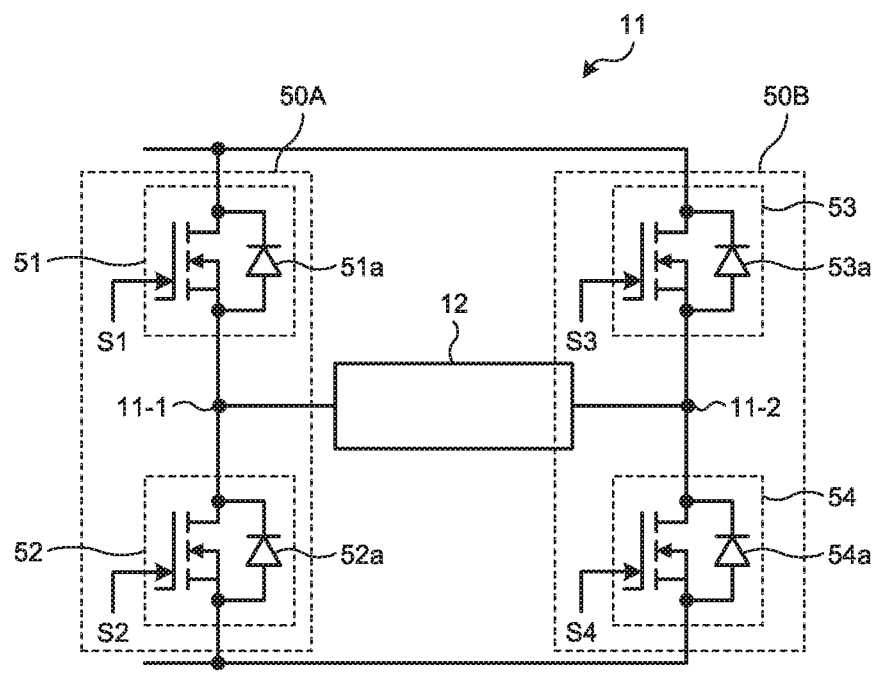
FIG. 2 is a diagram illustrating a circuit configuration of a single-phase inverter illustrated in FIG. 1.

FIG. 2 is a diagram illustrating a circuit configuration of the single-phase inverter illustrated in FIG. 1. The single-phase inverter 11 includes a plurality of switching elements 51, 52, 53, and 54 bridge-connected to one another. In addition to the plurality of switching elements 51, 52, 53, and 54 of the single-phase inverter 11, FIG. 2 illustrates the single-phase motor 12 connected to the single-phase inverter 11. Each of the two switching elements 51 and 53 located on a high-potential side is referred to as an upper-arm switching element. Each of the two switching elements 52 and 54 located on a low-potential side is referred to as a lower-arm switching element.

The switching element 51 has a connection end 11-1 connected to the switching element 52. The switching element 53 has a connection end 11-2 connected to the switching element 54. The connection ends 11-1 and 11-2 define alternating-current ends in a bridge circuit. The single-phase motor 12 is connected to the connection ends 11-1 and 11-2.

A body diode 51a connected in parallel between a drain and a source of the switching element 51 is formed in the switching element 51. A body diode 52a connected in parallel between a drain and a source of the switching element 52 is formed in the switching element 52. A body diode 53a connected in parallel between a drain and a source of the switching element 53 is formed in the switching element 53. A body diode 54a connected in parallel between a drain and a source of the switching element 54 is formed in the switching element 54. Each of the body diodes 51a, 52a, 53a, and 54a is a parasitic diode formed inside a MOSFET and is used as a freewheeling diode.

Each of the plurality of switching elements 51, 52, 53, and 54 is, for example, a MOSFET formed of a silicon-based material. However, each of the plurality of switching elements 51, 52, 53, and 54 is not limited to the MOSFET formed of a silicon-based material, and at least one of the plurality of switching elements 51, 52, 53, and 54 may be a MOSFET formed of a wide band gap semiconductor such as silicon carbide, a gallium nitride-based material, or diamond.

In general, wide band gap semiconductors have higher withstand voltage and heat resistance than silicon semiconductors. Thus, using a wide band gap semiconductor in at least one of the plurality of switching elements 51, 52, 53, and 54 increases the withstand voltage and the allowable current density of the switching elements 51, 52, 53, and 54, which makes it possible to reduce the size of a semiconductor module incorporating the switching elements 51, 52, 53, and 54 therein. Since wide band gap semiconductors also have high heat resistance, it is possible to reduce the size of a heat dissipation unit for dissipating heat generated in a semiconductor module, and also to simplify a heat dissipation structure for dissipating the heat generated in the semiconductor module.

Figure 3:
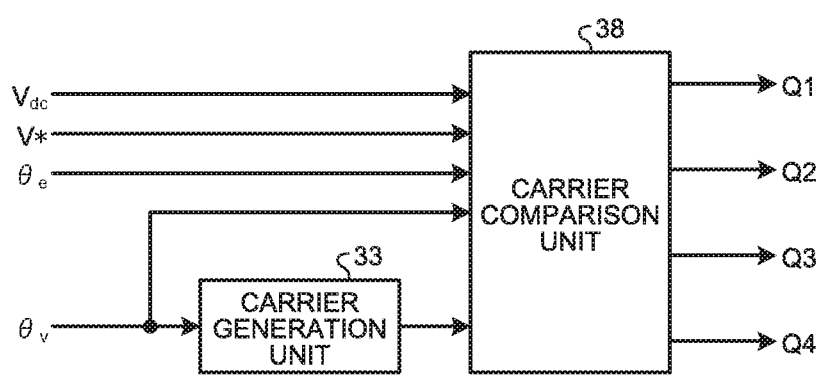
FIG. 3 is a diagram illustrating a functional configuration for generating pulse width modulation (PWM) signals illustrated in FIG. 1.
Figure 4:
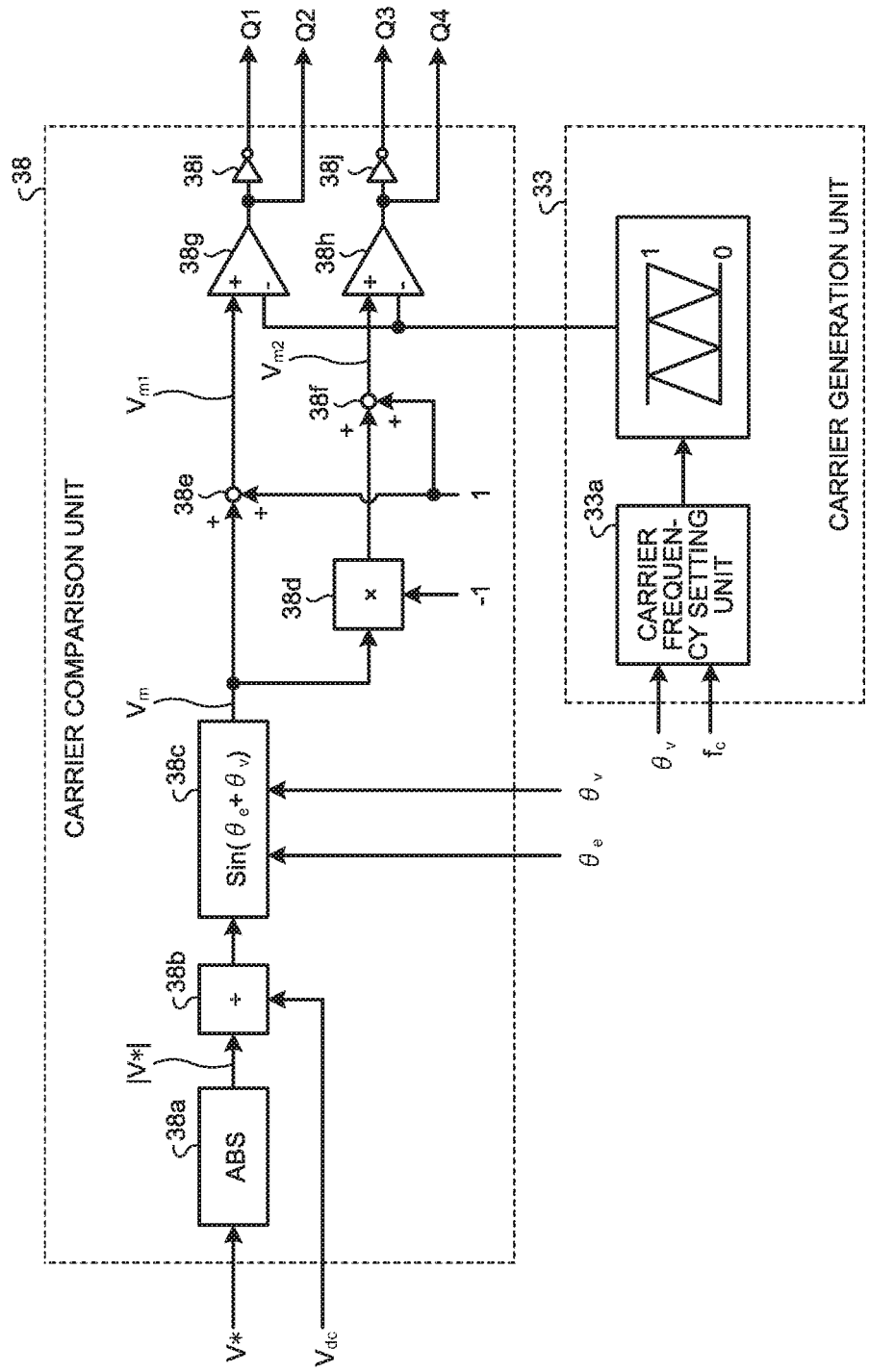
FIG. 4 is a diagram illustrating in detail a carrier comparison unit and a carrier generation unit illustrated in FIG. 3.

FIG. 3 is a diagram illustrating a functional configuration for generating the PWM signals illustrated in FIG. 1. FIG. 4 is a diagram illustrating in detail the carrier comparison unit and the carrier generation unit illustrated in FIG. 3. A function of generating the PWM signals Q1, Q2, Q3, and Q4 can be implemented by the carrier generation unit 33 and the carrier comparison unit 38 illustrated in FIG. 3. The function of the carrier comparison unit 38 is implemented by the processor 31 illustrated in FIG. 1. The carrier comparison unit 38 receives inputs of an advance phase $\theta_v$, a reference phase $\theta_e$, a carrier generated by the carrier generation unit 33, the direct-current voltage $V_{dc}$, and a voltage amplitude command V* which is an amplitude value of a voltage command $V_m$. The carrier comparison unit 38 generates PWM signals on the basis of the advance phase $\theta_v$, the reference phase $\theta_e$, the carrier, the direct-current voltage $V_{dc}$, and the voltage amplitude command V*.

The advance phase $\theta_v$ and the reference phase $\theta_e$ are used to generate voltage commands $V_{m1}$ and $V_{m2}$ illustrated in FIG. 4. The advance phase $\theta_v$ is calculated by an advance phase calculation unit described later. The "advance phase" is a phase that represents an advance angle $\theta_{vv}$ which is an advanced angle of a voltage command. The "advanced angle" is a phase difference between a motor applied voltage and a motor induced voltage. The motor applied voltage is a voltage applied to a stator winding by the single-phase inverter 11. The motor induced voltage is a voltage induced in the stator winding. The motor applied voltage is synonymous with an inverter output voltage which is an output voltage of the single-phase inverter 11. When the motor applied voltage advances relative to the motor induced voltage, the "advanced angle" takes a positive value. The reference phase $\theta_e$ is calculated by a rotation speed calculation unit described later. The reference phase $\theta_e$ is a phase obtained by converting a rotor mechanical angle, which is an angle of the rotor 12a from a reference position, into an electrical angle.

As illustrated in FIG. 4, the carrier generation unit 33 includes a carrier frequency setting unit 33a. A carrier frequency $f_c$ [Hz], which is a frequency of a carrier, is set in the carrier frequency setting unit 33a. The carrier frequency setting unit 33a generates a carrier synchronized with a cycle of the advance phase $\theta_v$. The generated carrier is output to the carrier comparison unit 38. FIG. 4 illustrates a waveform of a triangular wave which is an example of the carrier. The triangular wave is a signal wave whose peak value is "1" and whose valley value is "0". The PWM control on the single-phase inverter 11 includes synchronous PWM control and asynchronous PWM control. In the case of the asynchronous PWM control, it is not necessary to synchronize the carrier with the advance phase $\theta_v$.

The carrier comparison unit 38 includes an absolute value calculation unit 38a, a division unit 38b, a multiplication unit 38c, a multiplication unit 38d, an addition unit 38e, an addition unit 38f, a comparison unit 38g, a comparison unit 38h, an output inversion unit 38i, and an output inversion unit 38j.

The absolute value calculation unit 38a calculates an absolute value |V*| of the voltage amplitude command V*. The division unit 38b divides the absolute value |V*| by the direct-current voltage $V_{dc}$. For example, even when a voltage of the power supply 10 decreases, the division of the absolute value |V*| by the direct-current voltage $V_{dc}$ can increase a modulation rate in such a manner as to prevent the motor applied voltage from decreasing due to that voltage decrease of the power supply 10 as compared with a case where the battery voltage decreases and the division by the direct-current voltage $V_{dc}$ is not performed. The battery voltage means an output voltage of the battery.

The multiplication unit 38c adds the advance phase $\theta_v$ to the reference phase $\theta_e$, and calculates a sine which is a result of the addition. The multiplication unit 38c calculates the voltage command $V_m$ by multiplying the calculated sine by an output of the division unit 38b.

The addition unit 38e adds 1 to the voltage command $V_m$ which is an output of the multiplication unit 38c. An output of the addition unit 38e is input to the comparison unit 38g as the voltage command $V_{m1}$ for driving the two switching elements 51 and 52 illustrated in FIG. 2. The voltage command $V_{m1}$ and the carrier are input to the comparison unit 38g. The comparison unit 38g compares the voltage command $V_{m1}$ with the carrier, thereby providing the comparison result that is the PWM signal Q2.

The output inversion unit 38i inverts an output of the comparison unit 38g. An output of the output inversion unit 38i is the PWM signal Q1. The output inversion unit 38i prevents the switching elements 51 and 52 from being turned on at the same time.

The multiplication unit 38d multiplies, by −1, the voltage command $V_m$ which is the output of the multiplication unit 38c. The addition unit 38f adds 1 to an output of the multiplication unit 38d. An output of the addition unit 38f is input to the comparison unit 38h as the voltage command $V_{m2}$ for driving the two switching elements 53 and 54 illustrated in FIG. 2. The voltage command $V_{m2}$ and the carrier are input to the comparison unit 38h. The comparison unit 38h compares the voltage command $V_{m2}$ with the carrier, thereby providing the comparison result that is the PWM signal Q4.

The output inversion unit 38j inverts an output of the comparison unit 38h. An output of the output inversion unit 38j is the PWM signal Q3. The output inversion unit 38j prevents the switching elements 53 and 54 from being turned on at the same time.

Figure 5:
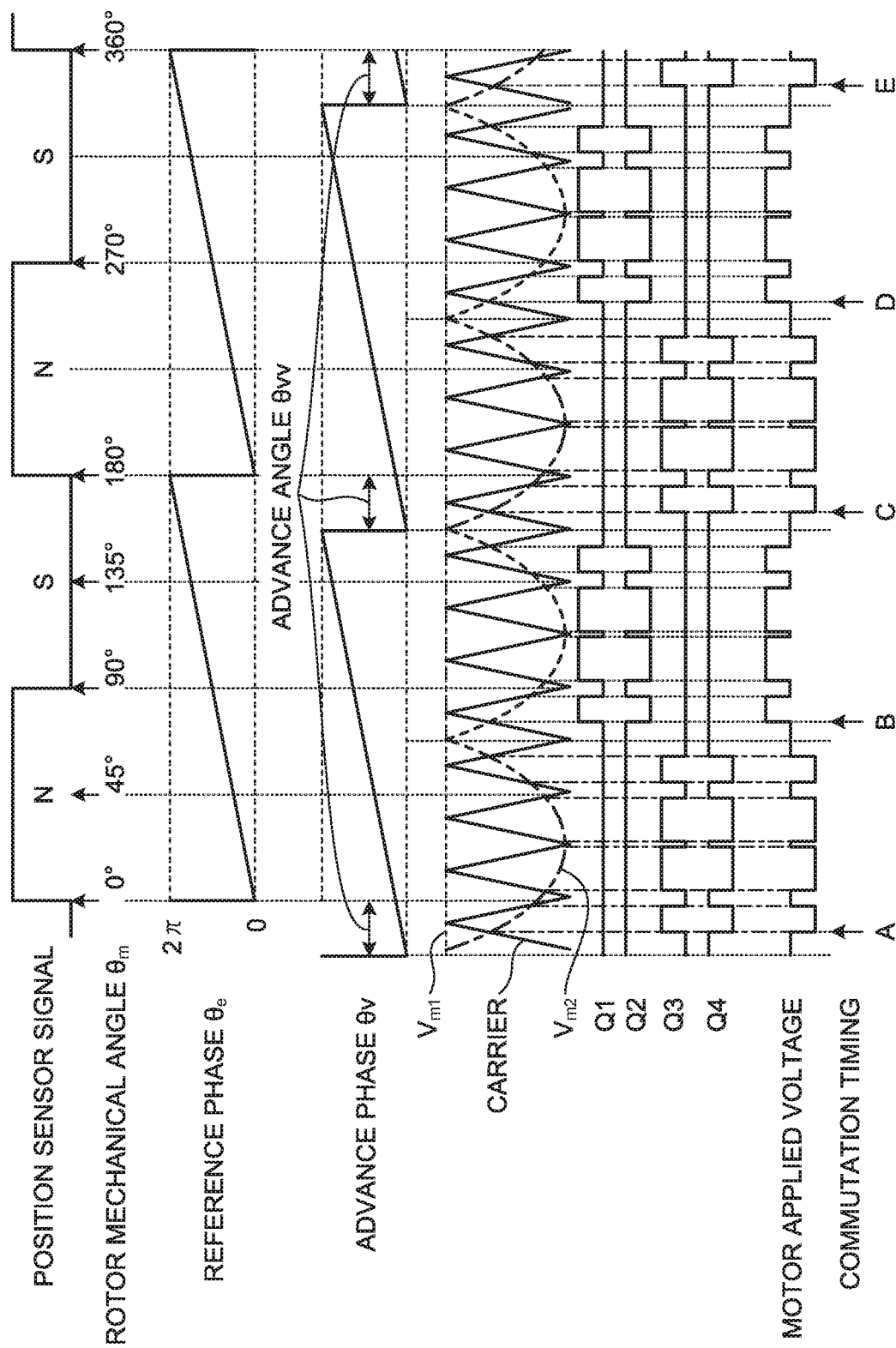
FIG. 5 is a time chart illustrating waveforms of voltage commands and the PWM signals illustrated in FIG. 4, and a motor applied voltage.

FIG. 5 is a time chart illustrating waveforms of the voltage commands and the PWM signals illustrated in FIG. 4, and the motor applied voltage. FIG. 5 illustrates waveforms of the position sensor signal, a rotor mechanical angle $\theta_m$, the reference phase $\theta_e$, the advance phase $\theta_v$, the voltage commands $V_{m1}$ and $V_{m2}$, the carrier, the PWM signals Q1, Q2, Q3, and Q4, and the motor applied voltage. The waveform of the voltage command $V_{m1}$ is indicated by a broken line. The waveform of the voltage command $V_{m2}$ is indicated by a dot-and-dash line. These waveforms are waveforms detected when the rotor 12a including four permanent magnets makes one rotation, for example. A, B, C, D, and E indicated by arrows in FIG. 5 represent timing of commutation of a current flowing through each coil wound around the stator 12b of the single-phase motor 12.

The carrier comparison unit 38 illustrated in FIG. 4 can generate the PWM signals Q1, Q2, Q3 and Q4, using the voltage commands $V_{m1}$ and $V_{m2}$ having the waveforms illustrated in FIG. 5. As a result of using such PWM signals Q1, Q2, Q3, and Q4 to control the switching elements 51, 52, 53, and 54 in the single-phase inverter 11, a PWM-controlled motor applied voltage is applied to the single-phase motor 12. The motor applied voltage is a signal that takes a high level, low level, or zero level potential.

Known modulation methods used when generating the PWM signals Q1, Q2, Q3, and Q4 include a bipolar modulation method and a unipolar modulation method. The bipolar modulation method is a modulation method that outputs a voltage pulse that changes between positive and negative potentials. The unipolar modulation method is a modulation method that outputs a voltage pulse that changes among three potentials every half cycle of a power supply, that is, a voltage pulse that changes among a positive potential, a negative potential, and a zero potential.

The waveforms of the PWM signals Q1, Q2, Q3, and Q4 illustrated in FIG. 5 are obtained by the unipolar modulation. Any modulation method may be used for the motor drive device 2 according to the present embodiment. Where it is necessary to bring the waveform of the motor applied voltage and the waveform of a current flowing through each coil of the single-phase motor 12 closer to a sinusoidal wave, the unipolar modulation having a smaller harmonic content is more preferably employed than the bipolar modulation.

As described above, the motor applied voltage is determined by comparing the carrier with the voltage commands. As the number of motor rotations increases, the frequency of each voltage command increases, so that the number of voltage pulses included in the motor applied voltage output in one cycle of the electrical angle decreases. As a result, an influence of the number of voltage pulses on distortion of a current waveform increases. Generally, when the number of voltage pulses is an even number, even-order harmonics are superimposed on the motor applied voltage, and the symmetry between a positive-side waveform and a negative-side waveform disappears. Accordingly, in order to bring the waveform of the current flowing through each coil of the single-phase motor 12 closer to a sinusoidal wave in which the harmonic content is reduced, the number of voltage pulses in one cycle of the electrical angle is preferably controlled so as to be an odd number. Controlling the number of voltage pulses in one cycle of the electrical angle so as to be an odd number makes it possible to bring the waveform of the current flowing through each coil of the single-phase motor 12 closer to a sinusoidal wave.

Figure 6:
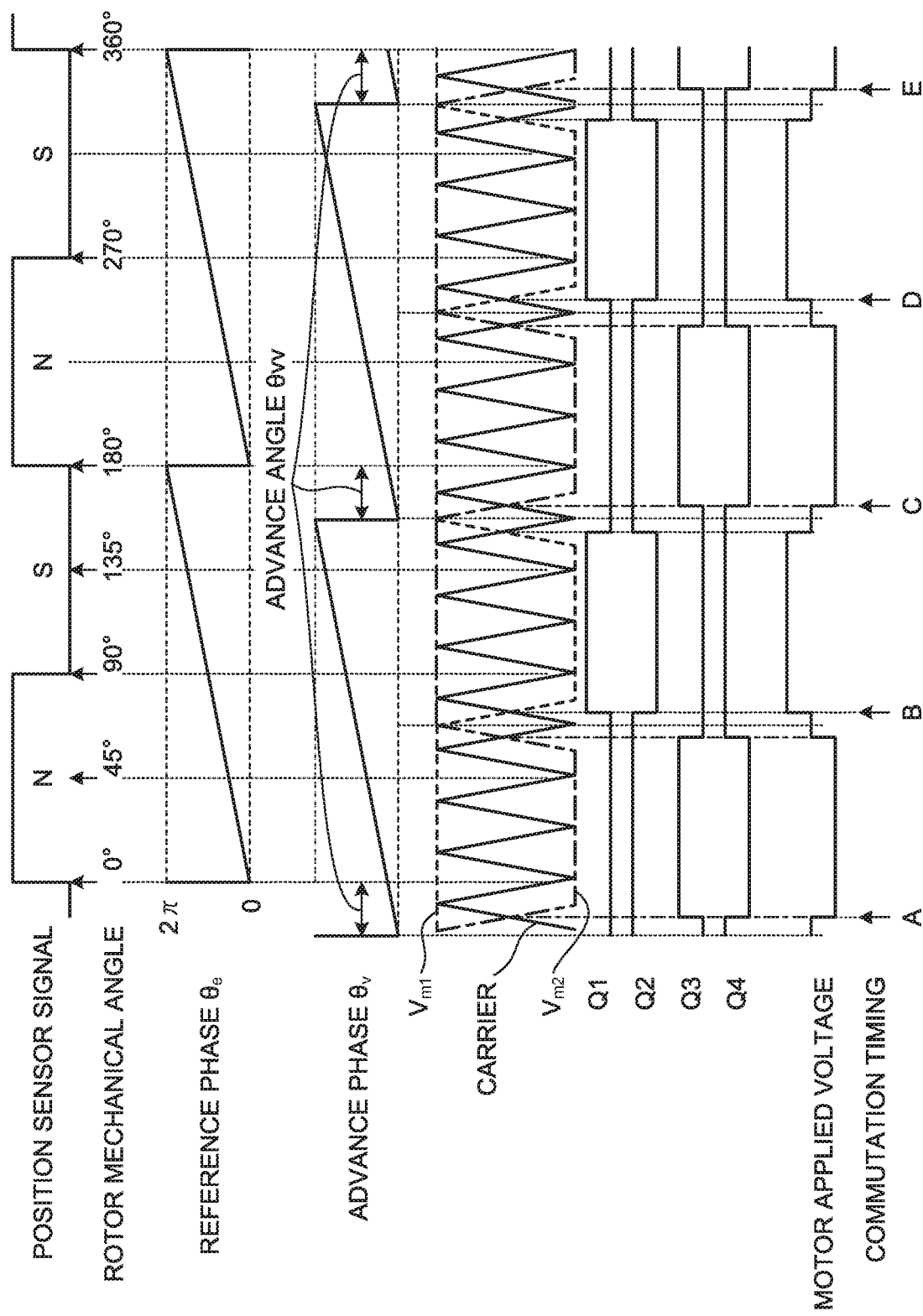
FIG. 6 is a time chart illustrating waveforms of the voltage commands illustrated in FIG. 4 when modulated, waveforms of the PWM signals, and a waveform of the motor applied voltage.

FIG. 6 is a time chart illustrating waveforms of the voltage commands illustrated in FIG. 4 when modulated, waveforms of the PWM signals, and a waveform of the motor applied voltage. FIG. 6 illustrates the voltage commands $V_{m1}$ and $V_{m2}$ that indicate constant values during overmodulation. What is meant by overmodulation is that a modulation rate exceeds 1. As illustrated in FIG. 6, when the voltage commands $V_{m1}$ and $V_{m2}$ during overmodulation exceed a peak value of the carrier, the number of pulses in the PWM signals decreases as compared with that when the modulation rate is 1 or less. When the number of pulses in the PWM signals decreases, the controllability of the switching elements provided in the single-phase inverter 11 deteriorates. Therefore, when a discharge voltage of the battery changes, the output voltage of the single-phase inverter 11, that is, the motor applied voltage may also change. For example, a value of the discharge voltage of the battery immediately after the battery is fully charged is higher than an average value of voltages from the start to the end of discharge. When the voltage commands $V_{m1}$ and $V_{m2}$ are controlled such that the voltage commands $V_{m1}$ and $V_{m2}$ are constant values with the value of the discharge voltage being high, the motor applied voltage also increases. As a result, a flow of excessive current through the single-phase motor 12 as well as an increase in the discharge current of the battery may occur.

In addition, when the voltage commands $V_{m1}$ and $V_{m2}$ become constant in the overmodulation region, the current is controlled so that the motor applied voltage becomes constant. For example, when a remaining capacity of the battery is reduced and an output voltage of the battery is decreased, a discharge current of the battery increases due to the voltage commands being controlled such that the voltage commands are constant. Accordingly, the increase in the discharge current may increase a temperature of the battery, which results in deterioration of the performance of the battery and shorter life of the battery.

As described above, controlling the voltage commands $V_{m1}$ and $V_{m2}$ such that the voltage commands $V_{m1}$ and $V_{m2}$ are constant in the overmodulation region may increase the motor applied voltage and shorten the life of the battery as well. In order to solve such a problem, the motor drive device 2 according to the present embodiment is designed such that the voltage commands $V_{m1}$ and $V_{m2}$ in the overmodulation region decrease when the battery voltage decreases.

Figure 7:
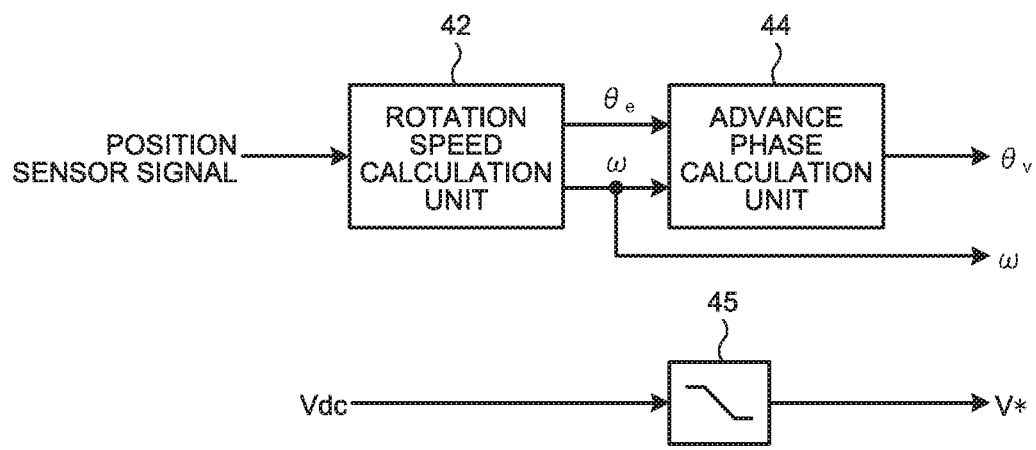
FIG. 7 is a diagram illustrating a functional configuration for calculating an advance phase and a voltage amplitude command illustrated in FIGS. 3 and 4.

FIG. 7 is a diagram illustrating a functional configuration for calculating the advance phase and the voltage amplitude command illustrated in FIGS. 3 and 4. The respective functions of a rotation speed calculation unit 42, an advance phase calculation unit 44, and a voltage amplitude command control unit 45 illustrated in FIG. 7 are implemented by the processor 31 and the memory 34 illustrated in FIG. 1. That is, a computer program for executing processes of the rotation speed calculation unit 42, the advance phase calculation unit 44, and the voltage amplitude command control unit 45 is stored in the memory 34. The processor 31 then reads and executes the program, thereby implementing the functions of the rotation speed calculation unit 42, the advance phase calculation unit 44, and the voltage amplitude command control unit 45.

The rotation speed calculation unit 42 calculates the rotation speed $\omega$ and the reference phase $\theta_e$ of the single-phase motor 12 on the basis of the position sensor signal 21a. The reference phase $\theta_e$ is a phase obtained by converting the rotor mechanical angle $\theta_m$, which is a rotation angle of the rotor 12a from the reference position, into an electrical angle. The advance phase calculation unit 44 calculates the advance phase $\theta_v$ on the basis of the rotation speed $\omega$ and the reference phase $\theta_e$ calculated by the rotation speed calculation unit 42.

Figure 8:
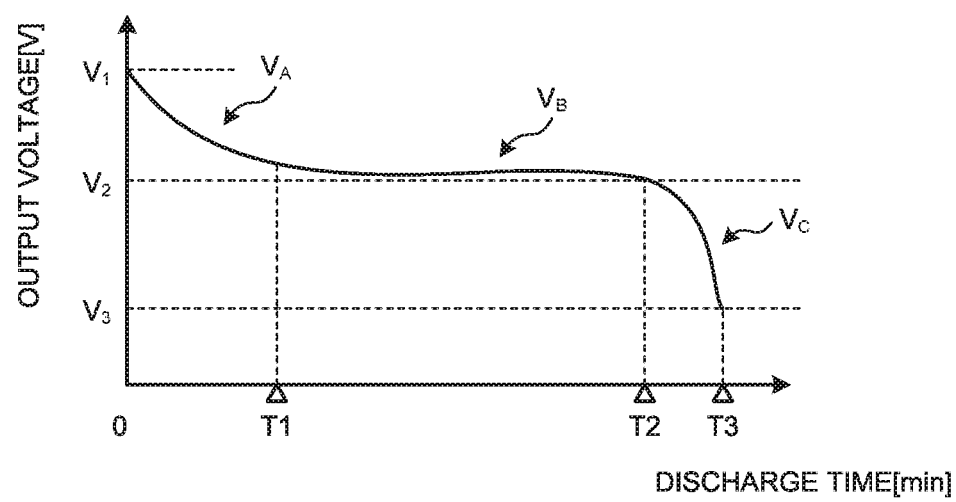
FIG. 8 is a diagram illustrating a discharge characteristic of a power supply illustrated in FIG. 1.
Figure 9:
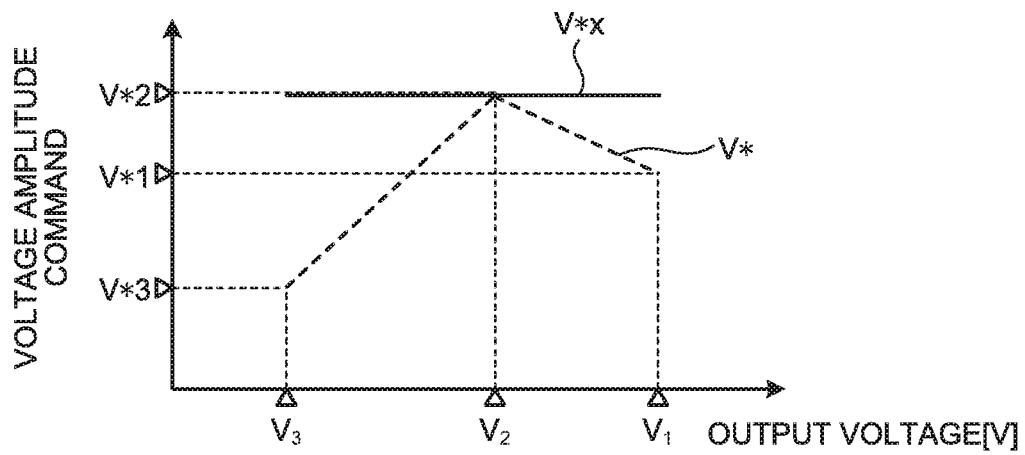
FIG. 9 is a diagram illustrating a relationship between direct-current voltages illustrated in FIG. 8 and voltage commands.
Figure 10:
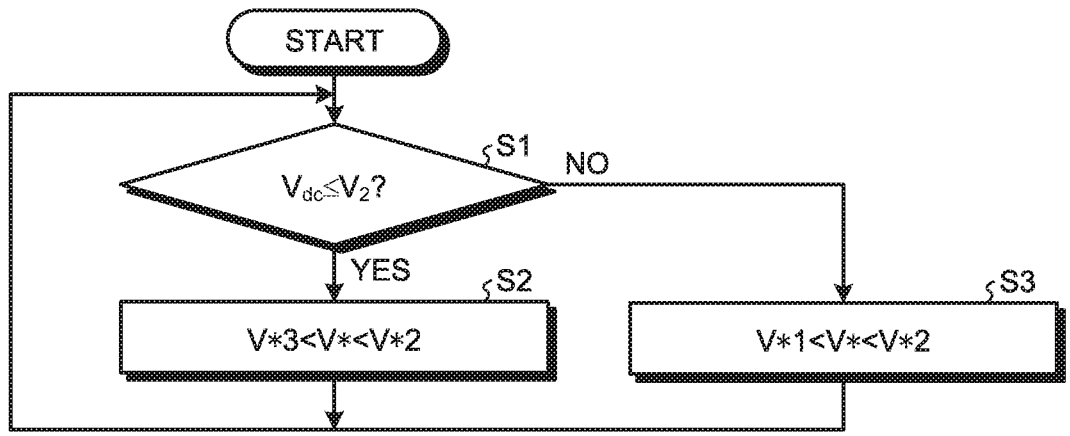
FIG. 10 is a flowchart explaining an operation of voltage command control by a voltage amplitude command control unit illustrated in FIG. 7.

Next, a control operation of the voltage commands will be described. FIG. 8 is a diagram illustrating a discharge characteristic of the power supply illustrated in FIG. 1. FIG. 9 is a diagram illustrating a relationship between the direct-current voltages illustrated in FIG. 8 and the voltage commands. FIG. 10 is a flowchart explaining an operation of voltage command control by the voltage amplitude command control unit illustrated in FIG. 7.

FIG. 8 illustrates the discharge characteristic of the battery, the vertical axis represents the output voltages of the battery, and the horizontal axis represents discharge time of the battery. The battery has an output voltage $V_A$ from the start of discharge of the battery immediately after the battery is fully charged, to a time T1. The time T1 is a time after a lapse of a predetermined time from the start of the discharge. The battery has an output voltage $V_B$ from the time T1 to a time T2. The time T2 is a time after a lapse of a predetermined time from the time T1. The output voltage $V_A$ indicates a value higher than the output voltage $V_B$. In addition, the battery has an output voltage $V_c$ from the time T2 to a time T3. The time T3 is a time after a lapse of a predetermined time from the time T2. The output voltage $V_c$ indicates a value lower than the output voltage $V_B$. The output voltage $V_B$ is a first voltage. The output voltage $V_c$ is a second voltage. The output voltage $V_A$ is a third voltage. A voltage $V_1$ represents, for example, a discharge start voltage. A voltage $V_3$ represents, for example, a discharge end voltage. A voltage $V_2$ represents, for example, an average voltage obtained by averaging the output voltages from the start of the discharge to the end of the discharge. Provided that the voltages $V_1$, $V_2$, and $V_3$ have a relationship of $V_1 > V_2 > V_3$, the voltage $V_1$ may be a voltage lower than the discharge start voltage, the voltage $V_3$ may be a voltage higher than the discharge end voltage, and the voltage $V_2$ may be a voltage higher or lower than the average voltage.

The horizontal axis in FIG. 9 represents the output voltages of the battery, and the vertical axis in FIG. 9 represents the voltage amplitude commands. V*x indicated by a solid line is a voltage amplitude command used when the voltage commands are controlled such that the voltage commands are constant. V* indicated by a broken line is a voltage amplitude command output from the voltage amplitude command control unit 45 according to the present embodiment. A table indicating correspondence relationships between the output voltages and the voltage amplitude commands indicated by broken lines is set in the voltage amplitude command control unit 45. V*1 is a voltage amplitude command corresponding to the voltage $V_1$. V*3 is a voltage amplitude command corresponding to the voltage $V_3$. V*2 is a voltage amplitude command corresponding to the voltage $V_2$. The voltage amplitude commands V*1 and V*3 are lower than the voltage amplitude command V*2.

By referring to the table, the voltage amplitude command control unit 45 determines whether the output voltage of the battery, that is, the direct-current voltage $V_{dc}$ is equal to or lower than the voltage $V_2$ (step S1).

If the direct-current voltage $V_{dc}$ is equal to or lower than the voltage $V_2$ (step S1, Yes), the voltage amplitude command control unit 45 outputs the voltage amplitude command V* higher than the voltage amplitude command V*3 and lower than the voltage amplitude command V*2 (step S2).

If the direct-current voltage $V_{dc}$ is higher than the voltage $V_2$ (step S1, No), the voltage amplitude command control unit 45 outputs the voltage amplitude command V* higher than the voltage amplitude command V*1 and lower than the voltage amplitude command V*2 (step S3).

The voltage amplitude command V* output from the voltage amplitude command control unit 45 is input to the carrier comparison unit 38. The carrier comparison unit 38 generates a voltage command lower than the voltage command $V_m$ corresponding to the voltage amplitude command V*2. As a result of the generation of this voltage command, a carrier signal is generated with a modulation rate lower than that when the voltage amplitude command V*2 is input. A voltage lower than the motor applied voltage at a time of input of the voltage amplitude command V*2 is applied to the single-phase motor 12.

When the direct-current voltage which is an output voltage of the battery changes from the first voltage to the second voltage, as described above, the motor drive device 2 changes a voltage applied to the motor from a first applied voltage to a second applied voltage lower than the first applied voltage. In addition, when the direct-current voltage is the third voltage higher than the first voltage, the motor drive device 2 outputs, as the motor applied voltage, a third applied voltage lower than the first applied voltage. Consequently, the motor applied voltage is decreased and the discharge current of the battery is decreased as compared with the case where the voltage commands are controlled such that the voltage commands are constant. Since the heat generation in the battery is reduced by the decrease in the discharge current, it is possible to reduce the deterioration of the performance of the battery and to extend the life of the battery. In addition, since the current flowing through the heat-generating components such as the resistors and switching elements that define the single-phase inverter 11 is decreased, the heat generation in these heat-generating components is reduced, and the life of the heat-generating components can be extended. Furthermore, since the increase in the current is reduced to thereby enable utmost use of the capacity of the battery, it is possible to extend operating time of a product having the motor drive device 2 mounted therein.

Figure 11:
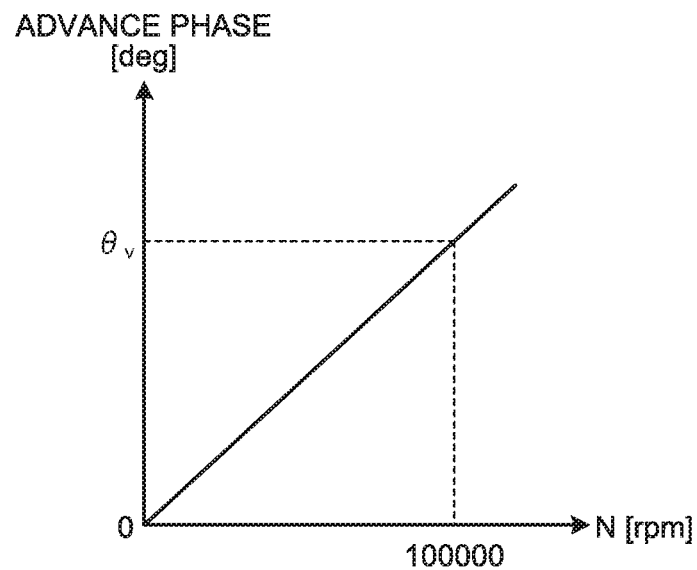
FIG. 11 is a diagram illustrating an example of a method of calculating the advance phase illustrated in FIG. 7.

Next, the advance angle control in the present embodiment will be described. FIG. 11 is a diagram illustrating an example of a method of calculating the advance phase illustrated in FIG. 7. The horizontal axis in FIG. 11 represents the number of motor rotations N, and the vertical axis in FIG. 11 represents the advance phase $\theta_v$. The number of motor rotations N is the number of rotations per unit time and corresponds to a rotation speed. As illustrated in FIG. 11, the advance phase $\theta_v$ can be determined using a function in which the advance phase $\theta_v$ increases as the number of motor rotations N increases. Although the example in FIG. 11 provides the advance phase $\theta_v$ determined by a first order linear function, the function determining the advance phase $\theta_v$ is not limited thereto. Any function other than the first order linear function may be used as long as the advance phase $\theta_v$ becomes the same or large in correspondence to the increase in the number of motor rotations N.

In a case of the electric blower, the load torque increases due to an increase in the number of rotations of blades that are a load of the motor, and also increases due to an increase in the diameter of an air passage. The diameter of the air passage indicates, for example, a size of a suction port of an electric vacuum cleaner.

For example, when the diameter of the air passage is large because nothing is in contact with the suction port, a force for sucking the wind is required. Accordingly, the load torque increases under the condition where the blades rotate at the same number of rotations. On the other hand, when the suction port is closed by something in contact with the suction port, the diameter of the air passage is narrowed and the force for sucking the wind is not necessary. Therefore, the load torque decreases under the condition where the blades rotate at the same number of rotations.

Next, an effect of the advance angle control will be described. Increasing the advance phase $\theta_v$ in correspondence to an increase in the number of rotations can widen a range of the number of rotations. When the advance phase $\theta_v$ is set to "0", the number of rotations is saturated at a point where the motor applied voltage is equal to the motor induced voltage. In order to further increase the number of rotations, the advance phase $\theta_v$ is advanced to weaken a magnetic flux generated in the stator due to an armature reaction, thereby reducing an increase in the motor induced voltage and thus increasing the number of rotations. Accordingly, a wide region of the number of rotations can be obtained by selecting the advance phase $\theta_v$ in correspondence to the number of rotations.

Where the motor drive device 2 in the present embodiment is applied to, for example, an electric vacuum cleaner, control for decreasing the voltage amplitude command V* in correspondence to the voltage of the battery and control for decreasing the advance phase $\theta_v$ with decrease in the number of motor rotations N are performed regardless of a change in the state of the suction port, that is, a change in the load torque. That is, in the motor drive device 2, an advance angle $\theta_{vv}$ calculated using the rotational position information is changed from the first advance angle to the second advance angle smaller than the first advance angle when the motor applied voltage changes from the first applied voltage to the second applied voltage. In addition, in the motor drive device 2, the third advance angle larger than the first advance angle is set as the advance angle $\theta_{vv}$ when the direct-current voltage is the third voltage higher than the first voltage. As described above, in addition to the control of the voltage amplitude command V*, the advance angle $\theta_{vv}$ is controlled such that the advance angle $\theta_{vv}$ changes in correspondence to the number of motor rotations N. As a result, a decrease in power factor is reduced and a decrease in power consumption is reduced as compared with a case where the advance angle $\theta_{vv}$ is controlled such that the advance angle $\theta_{vv}$ is constant. Furthermore, it is possible to obtain a large torque in a wide range of rotation speed while reducing the decrease in power consumption, which allows stable driving of the single-phase motor 12.

Figure 12:
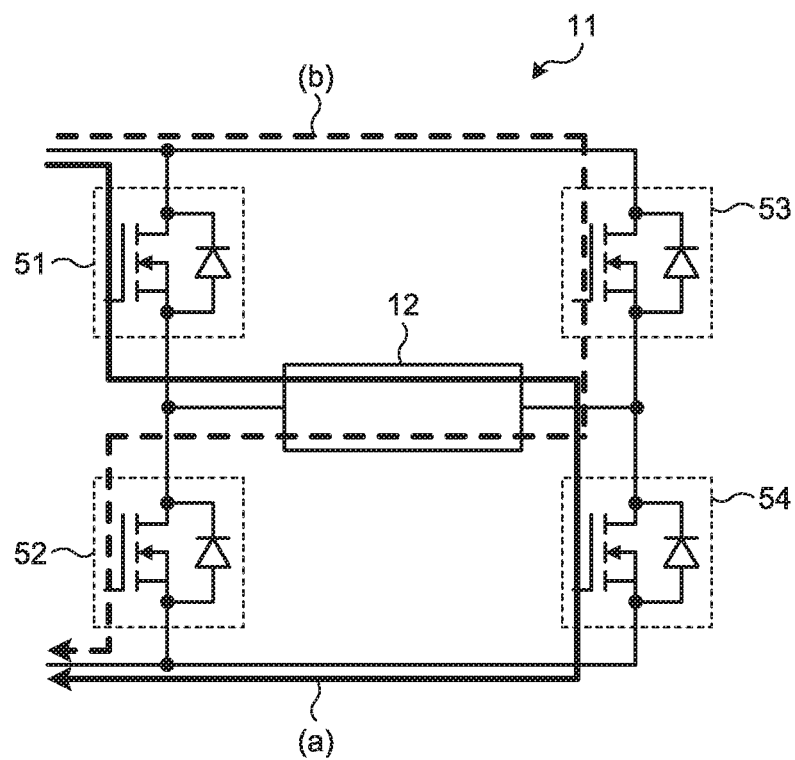
FIG. 12 is a first diagram illustrating a path of a motor current depending on the polarity of an inverter output voltage.
Figure 13:
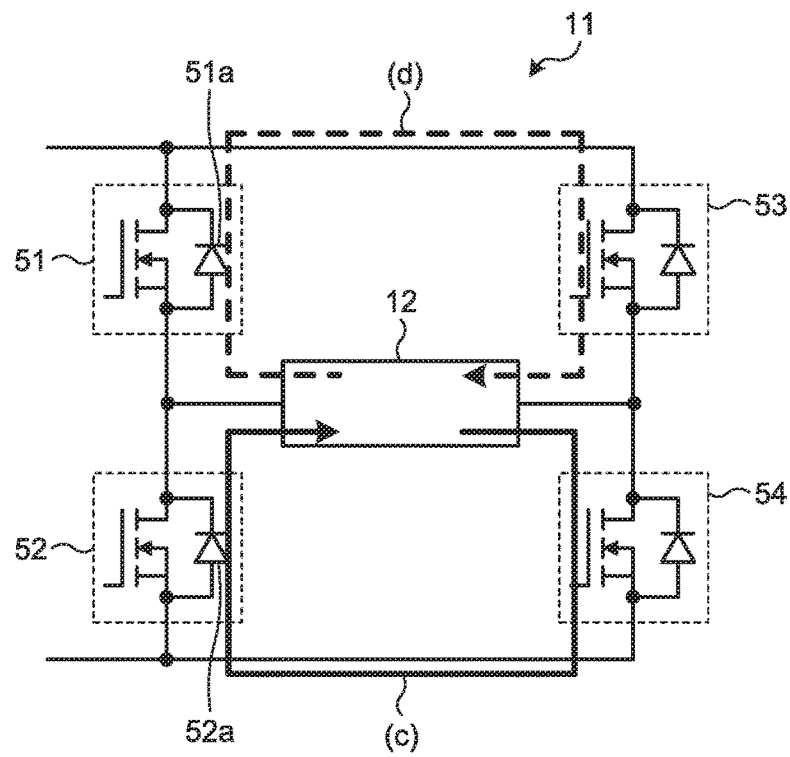
FIG. 13 is a second diagram illustrating the path of the motor current depending on the polarity of the inverter output voltage.
Figure 14:
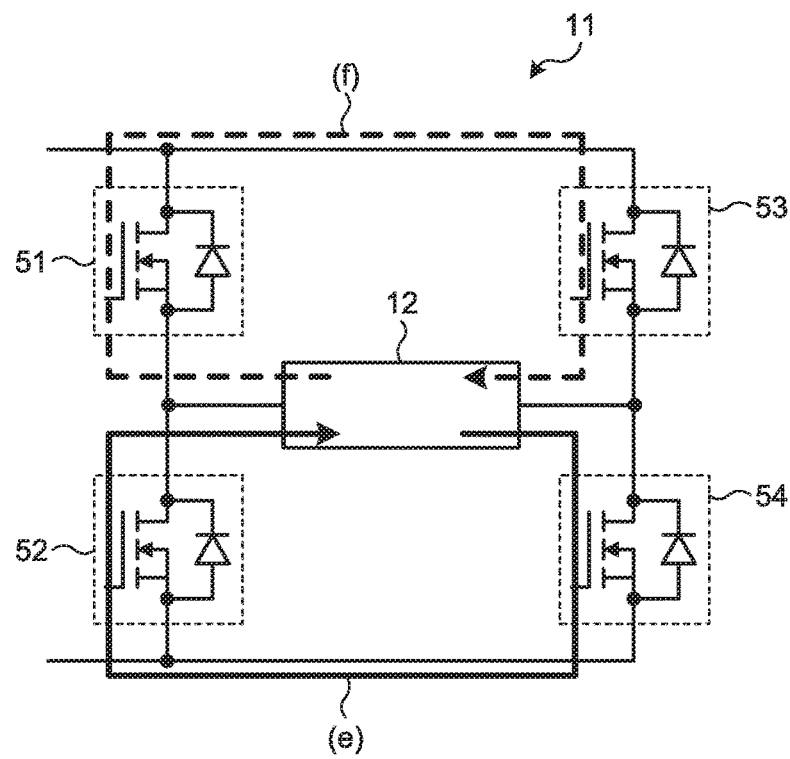
FIG. 14 is a third diagram illustrating the path of the motor current depending on the polarity of the inverter output voltage.
Figure 15:
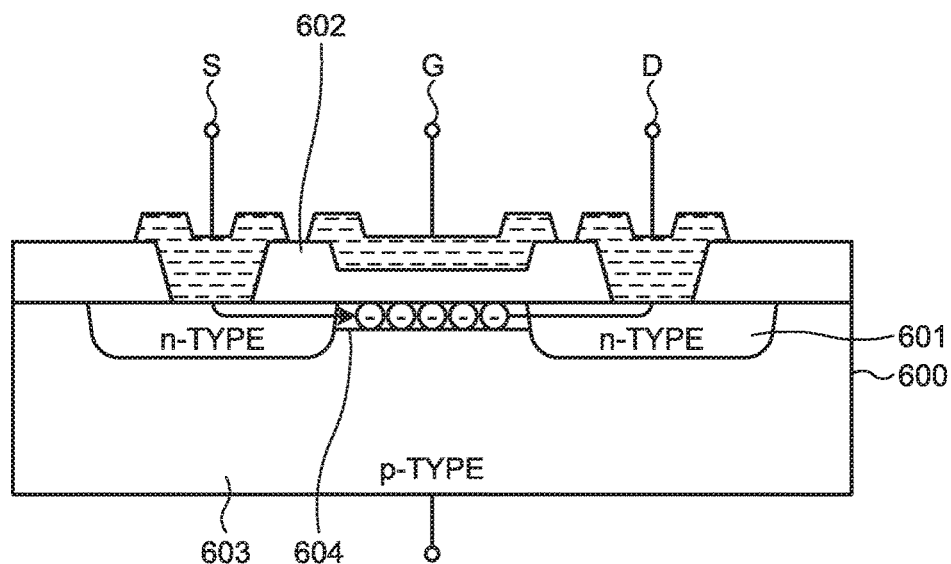
FIG. 15 is a schematic cross-sectional view illustrating a schematic structure of a metal-oxide-semiconductor field-effect transistor (MOSFET) that can be used as switching elements illustrated in FIG. 2.

Next, a loss reduction method in the present embodiment will be described with reference to FIGS. 12 to 15. FIG. 12 is a first diagram illustrating a path of a motor current depending on the polarity of the inverter output voltage. FIG. 13 is a second diagram illustrating the path of the motor current depending on the polarity of the inverter output voltage. FIG. 14 is a third diagram illustrating the path of the motor current depending on the polarity of the inverter output voltage. FIG. 15 is a schematic cross-sectional view illustrating a schematic structure of a MOSFET that can be used as the switching elements illustrated in FIG. 2. First, the schematic structure of the MOSFET will be described with reference to FIG. 15, and then the path of the motor current will be described with reference to FIGS. 12 to 14.

Figure 16:
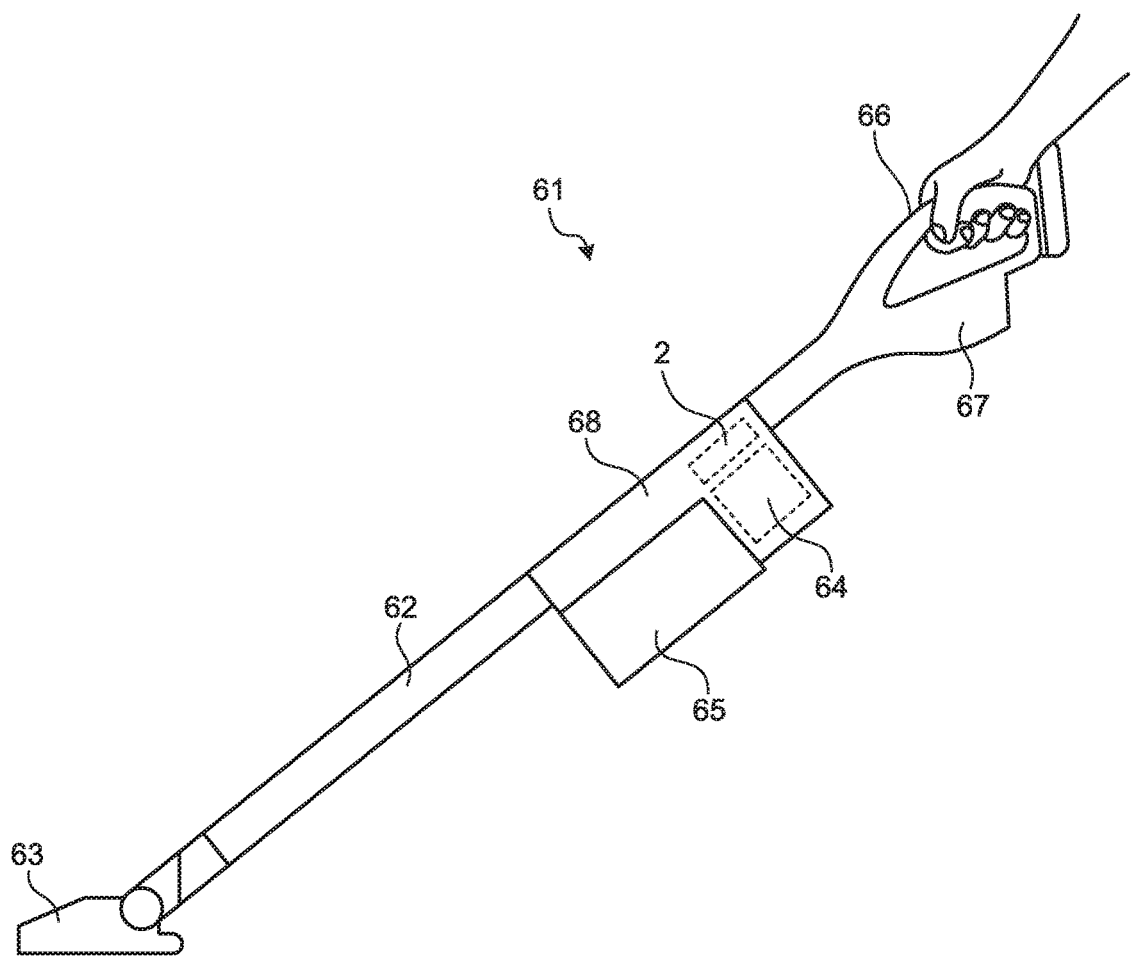
FIG. 16 is a configuration view of an electric vacuum cleaner including the motor drive device according to the embodiment of the present invention.

FIG. 15 illustrates an n-type MOSFET. In a case of the n-type MOSFET, a p-type semiconductor substrate 600 is used as illustrated in FIG. 16. A source electrode S, a drain electrode D, and a gate electrode G are formed on the semiconductor substrate 600. A high-concentration impurity is ion-implanted to form a region 601 of n-type at each of portions in contact with the source electrode S and the drain electrode D. In addition, the semiconductor substrate 600 has an oxide insulating film 602 formed thereon between the gate electrode G and a portion where the region 601 of n-type is not formed. That is, the oxide insulating film 602 is interposed between the gate electrode G and a region 603 of p-type in the semiconductor substrate 600.

When a positive voltage is applied to the gate electrode G, electrons are attracted to a boundary surface between the region 603 of p-type in the semiconductor substrate 600 and the oxide insulating film 602, such that the boundary surface is negatively charged. In a portion where the electrons are gathered, the electron density becomes higher than the hole density, such that the portion is changed into an n-type portion. The n-type portion serves as a path for a current and is called a channel 604. The channel 604 is an n-type channel in the example in FIG. 15. The MOSFET is controlled such that the MOSFET is turned on, thereby allowing more current to flow through the channel 604 than through a body diode formed in the region 603 of p-type.

When the polarity of the inverter output voltage is positive, as indicated by thick solid line (a) in FIG. 12, the current flows into the single-phase motor 12 through a channel of the switching element 51 which is an upper arm of a first phase, and flows out of the single-phase motor 12 and through a channel of the switching element 54 which is a lower arm of a second phase. When the polarity of the inverter output voltage is negative, as indicated by thick broken line (b) in FIG. 12, the current flows into the single-phase motor 12 through a channel of the switching element 53 which is an upper arm of the second phase, and flows out of the single-phase motor 12 and through a channel of the switching element 52 which is a lower arm of the first phase.

Next, a current path when the inverter output voltage is zero, that is, when a zero voltage is output from the single-phase inverter 11 will be described. When the inverter output voltage becomes zero after the positive inverter output voltage is generated, a current flows in a freewheeling mode in which a current flows between the single-phase inverter 11 and the single-phase motor 12 without current flowing from a power supply side, as indicated by thick solid line (c) in FIG. 13. More specifically, the direction of the current having flowed through the single-phase motor 12 immediately before that freewheeling mode is unchanged, such that the current flows out of the single-phase motor 12 and returns to the single-phase motor 12 through the channel of the switching element 54 which is the lower arm of the second phase and the body diode 52a of the switching element 52 which is the lower arm of the first phase. When the inverter output voltage becomes zero after the negative inverter output voltage is generated, the direction of the current having flowed immediately therebefore is opposite to the above direction of flow of current immediately before the inverter output voltage changes from the positive inverter output voltage to zero. As a result, as indicated by thick broken line (d) in FIG. 13, the direction of the freewheeling current is opposite to that indicated by thick solid line (c) in FIG. 13. More specifically, the current flowing out of the single-phase motor 12 returns to single-phase motor 12 through the body diode 51a of the switching element 51 which is the upper arm of the first phase and the channel of the switching element 53 which is the upper arm of the second phase.

As described above, in the freewheeling mode in which the current freewheelingly flows between the single-phase motor 12 and the single-phase inverter 11, the current flows through the body diode in either one of the first phase and the second phase. Generally, it is known that conduction loss is generally smaller when a current passes through a channel of a MOSFET than when a current passes in a forward direction of a diode. Therefore, in the present embodiment, the MOSFET including a body diode which would allow a current to flow therethrough is controlled such that the MOSFET is turned on to thereby reduce a flow current flowing through that body diode in the freewheeling mode providing the freewheeling current flows.

The switching element 52 is controlled such that the switching element 52 is turned on at a timing of the flow of the freewheeling current indicated by thick solid line (c) in FIG. 13 in the freewheeling mode. Such control on the switching element 52 allows most of the freewheeling current to flow through the channel of the switching element 52 having a small resistance value, as indicated by thick solid line (e) in FIG. 14. Consequently, the conduction loss in the switching element 52 is reduced. In addition, the switching element 51 is controlled such that the switching element 51 is turned on at timing when the freewheeling current indicated by thick broken line (d) of FIG. 13 flows. Such control on the switching element 51 allows most of the freewheeling current to flow through the channel of the switching element 51 having a small resistance value, as indicated by thick broken line (f) in FIG. 14. Consequently, the conduction loss in the switching element 51 is reduced.

As described above, the MOSFET including a body diode is controlled such that the MOSFET is turned on at the timing when the freewheeling current flows through that body diode. As a result, the loss in the switching element can be reduced. The MOSFET, which can be controlled in the above manner, can be surface-mounted on a substrate such that heat can be dissipated on the substrate. Part or all of the switching elements are formed of wide band gap semiconductors, such that heat generation in the MOSFET is reduced only by the substrate. Note that if heat can be dissipated only by the substrate, a heat sink is not required, which contributes to reduction in size of an inverter and can lead to reduction in size of a product.

In addition to the above-described heat dissipation method, a further heat dissipation effect can be obtained by installing the substrate in the air passage. Here, the air passage is a space around a fan such as an electric blower generating an air flow, or a passage through which the wind generated by the electric blower flows. As a result of installation of the substrate in the air passage, heat in a semiconductor element on the substrate can be dissipated by the wind generated by the electric blower, so that heat generation in the semiconductor element can be significantly reduced.

Next, an application example of the motor drive device according to the embodiment will be described. FIG. 16 is a configuration diagram of an electric vacuum cleaner including the motor drive device according to the embodiment of the present invention. An electric vacuum cleaner 61 includes a battery 67 which is a direct-current power supply, the motor drive device 2 illustrated in FIG. 1, an electric blower 64 driven by the single-phase motor 12 illustrated in FIG. 1, a dust collection chamber 65, a sensor 68, a suction port body 63, an extension pipe 62, and an operation portion 66. The battery 67 corresponds to the power supply 10 illustrated in FIG. 1.

A user who uses the electric vacuum cleaner 61 holds the operation portion 66 and operates the electric vacuum cleaner 61. The motor drive device 2 of the electric vacuum cleaner 61 drives the electric blower 64 by using the battery 67 as a power supply. By driving the electric blower 64, dust is sucked from the suction port body 63, and the sucked dust is collected in the dust collection chamber 65 via the extension pipe 62.

The electric vacuum cleaner 61 is a product in which multiple heat-generating components such as the battery 67, the electric blower 64, and an inverter substrate (not illustrated) are densely arranged in some portions, and a motor rotation speed changes considerably. The control method according to the embodiment described above is suitable for driving such a product having the densely arranged multiple heat-generating components. That is, in the electric vacuum cleaner 61, the voltage amplitude command V* is reduced in correspondence to the voltage of the battery 67, thereby decreasing a current flowing through the multiple heat-generating components. Accordingly, the heat generation in the multiple heat-generating components is reduced, and the life of the multiple heat-generating components can be extended. In addition, since the heat generation in the multiple heat-generating components is reduced, it is possible to reduce the number of heat-dissipating components for dissipating the heat generated in the multiple heat-generating components. Accordingly, the electric vacuum cleaner 61 can be reduced in size and weight. Furthermore, since the increase in the current is reduced to thereby enable utmost use of the capacity of the battery 67, it is possible to extend operating time of the electric vacuum cleaner 61.

Figure 17:
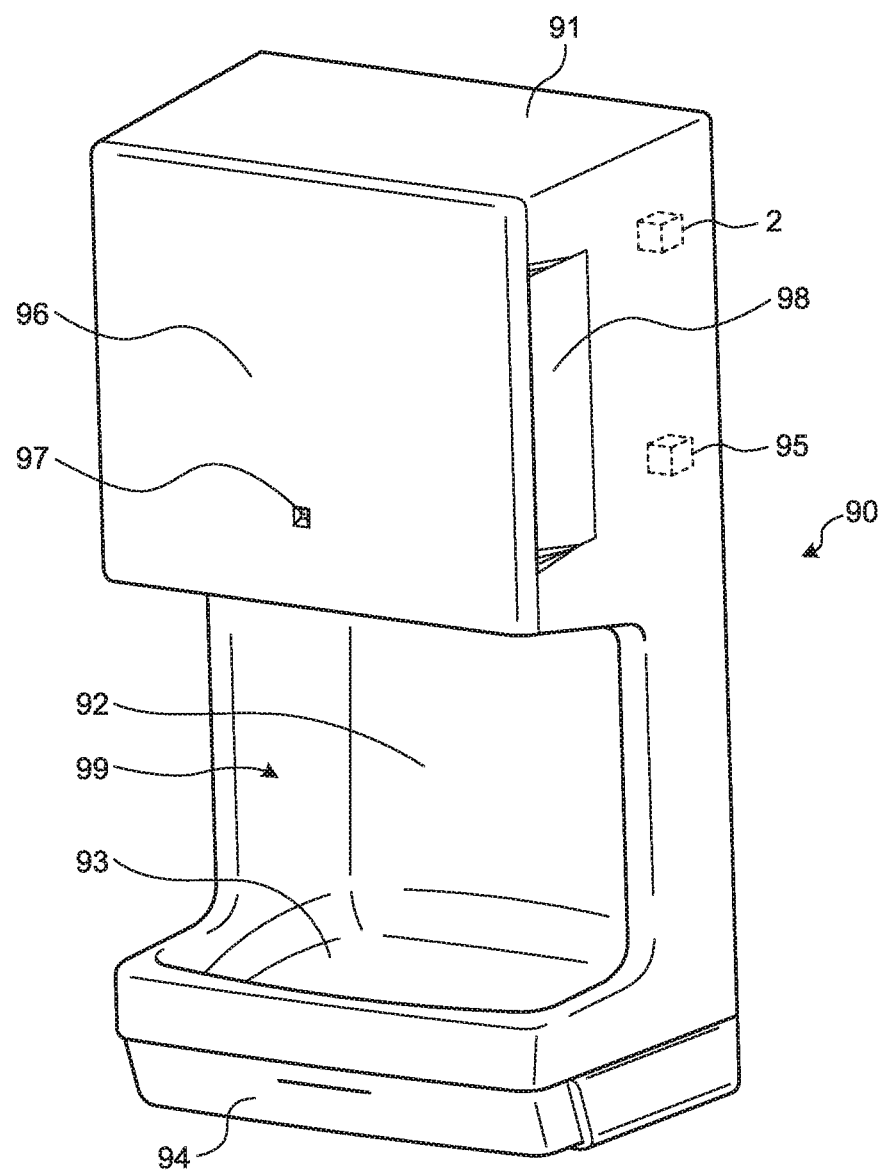
FIG. 17 is a configuration view of a hand dryer including the motor drive device according to the embodiment of the present invention.

FIG. 17 is a configuration view of a hand dryer including the motor drive device according to the embodiment of the present invention. A hand dryer 90 includes the motor drive device 2, a casing 91, a hand detection sensor 92, a water receiving portion 93, a drain container 94, a cover 96, a sensor 97, an air inlet port 98, and an electric blower 95. The sensor 97 is either a gyro sensor or a motion sensor. When the hand is inserted into a hand insertion portion 99 located above the water receiving portion 93 of the hand dryer 90, the electric blower 95 blows off water by air blow, and the blown-off water is collected in the water receiving portion 93 and then stored in the drain container 94.

Similarly to the electric vacuum cleaner 61 illustrated in FIG. 16, the hand dryer 90 is a product in which multiple heat-generating components are densely arranged and the motor rotation speed changes considerably. Therefore, the control method according to the embodiment described above is suitable for the hand dryer 90 as well, and an effect similar to that of the electric vacuum cleaner 61 can be obtained.

Figure 18:
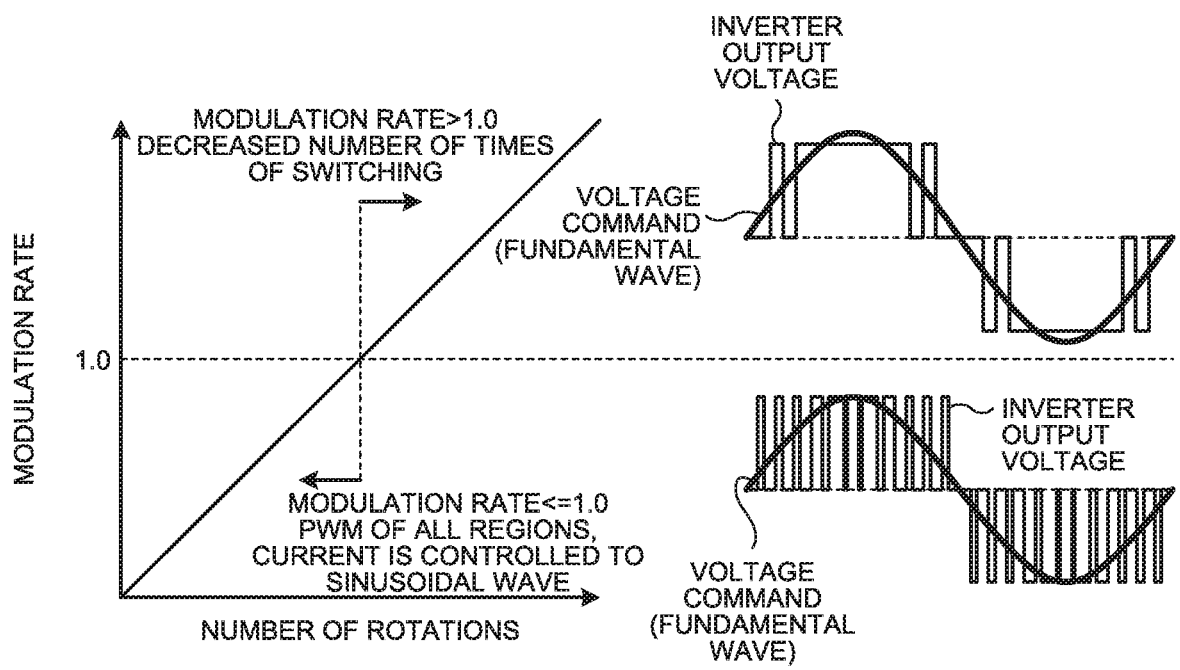
FIG. 18 is a diagram for explaining modulation control performed by the motor drive device according to the embodiment of the present invention.

FIG. 18 is a diagram for explaining modulation control performed by the motor drive device according to the embodiment of the present invention. The left side of FIG. 18 illustrates a relationship between the number of rotations and a modulation rate. The right side of FIG. 18 illustrates a waveform of an inverter output voltage when the modulation rate is 1.0 or less, and a waveform of the inverter output voltage when the modulation rate exceeds 1.0. Generally, a load torque of a rotating body increases as the number of rotations increases. For this reason, it is necessary to increase a motor output torque as the number of rotations increases. In addition, generally, the motor output torque increases in proportion to a motor current, and an increase in the motor current requires an increase in the inverter output voltage. Accordingly, the number of rotations can be increased by increasing the modulation rate and increasing the inverter output voltage.

Next, control on the number of rotations in the present embodiment will be described. The following description is based on the assumption that an electric blower is a load, and an operating range of the electric blower is divided as follows.

(A) Low-speed rotation region (region of a low number of rotations): 0 [rpm] to 100,000 [rpm]

(B) High-speed rotation region (region of a high number of rotations): 100,000 [rpm] or more A region sandwiched between (A) and (B) above is a gray area, and may be included in the low-speed rotation region or in the high-speed rotation region depending on applications.

First, the control in the low-speed rotation region will be described. In the low-speed rotation region, PWM control is performed with a modulation rate of 1.0 or less. Setting the modulation rate to 1.0 or less allows the motor current to be controlled such that the motor current provides a sinusoidal wave, and higher efficiency of the motor can be achieved. When the motor is operated using the carrier frequency common to the low-speed rotation region and the high-speed rotation region, the carrier frequency conforms to the high-speed rotation region, and therefore PWM pulses in the low-speed rotation region tends to increase more than necessary. For this reason, a method of lowering the carrier frequency in the low-speed rotation region to reduce switching loss may be used. Alternatively, control may be performed in such a way that the carrier frequency is changed in synchronization with the number of rotations, thereby preventing the number of pulses from changing in correspondence to the number of rotations.

Next, the control in the high-speed rotation region will be described. In the high-speed rotation region, the modulation rate is set to a value larger than 1.0. Setting the modulation rate to larger than 1.0 allows the inverter output voltage to increase and the number of times of switching performed by the switching elements in the inverter to decrease, thereby making it possible to reduce an increase in switching loss. The modulation rate exceeding 1.0 increases the motor output voltage, but decreases the number of times of switching, which results in concern about current distortion. However, the current distortion in the high-speed rotation region is smaller than that in the low-speed rotation region, thus lessening an effect on waveform distortion because a reactance component of the motor increases and di/dt which is a change component of the motor current decreases during high-speed rotation. Accordingly, in the high-speed rotation region, the modulation rate is set to a value larger than 1.0, and control is performed so that the number of switching pulses is reduced. By this control, an increase in switching loss can be reduced and higher efficiency can be achieved.

As described above, the boundary between the low-speed rotation region and the high-speed rotation region is ambiguous. Therefore, a first rotation speed that determines the boundary between the low-speed rotation region and the high-speed rotation region is set in the control unit 25. The control unit 25 performs control so that the modulation rate is set to 1.0 or less when the rotation speed of the motor or the load is equal to or lower than the first rotation speed, and the modulation rate is set to be exceeding 1 when the rotation speed of the motor or the load exceeds the first rotation speed.

As described above, in the present embodiment, the example configuration has been described in which the motor drive device 2 is applied to the electric vacuum cleaner 61 and the hand dryer 90, but the motor drive device 2 can be applied to an electric device on which a motor is mounted. Examples of the electric device on which a motor is mounted include an incinerator, a crusher, a dryer, a dust collector, a printing machine, a cleaning machine, a confectionery machine, a tea making machine, a woodworking machine, a plastic extruder, a cardboard machine, a packaging machine, a hot air generator, an office automation appliance, and an electric blower. The electric blower is a blowing means for object transportation, dust suction, or general blowing and exhausting.

The configurations described in the embodiment above are merely examples of the content of the present invention and can be combined with other known technology and part thereof can be omitted or modified without departing from the gist of the present invention.

The invention claimed is:

1. A motor drive device comprising
an inverter converting a direct-current voltage output from a battery into an alternating-current voltage, and outputting the alternating-current voltage as an applied voltage, the applied voltage being applied to a motor, wherein
the direct current voltage output from the battery includes a first voltage, a second voltage lower than the first voltage, and a third voltage higher than the first voltage,
the third voltage being a voltage from a start of discharge of the battery to a first time after a lapse of a predetermined time from the start of the discharge of the battery, the first voltage being a voltage from the first time to a second time after a lapse of a predetermined time from the first time, the second voltage being a voltage from the second time to an end of the discharge of the battery,
the applied voltage is lower when the direct-current voltage is the third voltage higher than the first voltage than when the direct-current voltage is the first voltage.

2. The motor drive device according to claim 1, wherein the applied voltage is lower when the direct-current voltage is the second voltage lower than the first voltage than when the direct-current voltage is the first voltage.

3. The motor drive device according to claim 2, comprising
a position sensor detecting a rotational position of a rotor of the motor, and outputting rotational position information indicating the detected rotational position, wherein
the applied voltage advances by an advance angle relative to an induced voltage generated in the motor, the advanced angle being calculated using the rotational position information, and wherein
when the applied voltage changes from an applied voltage at a time of the first voltage to the applied voltage at a time of the second voltage, the advance angle is changed from a first advance angle to a second advance angle smaller than the first advance angle.

4. The motor drive device according to claim 3, wherein when the direct-current voltage is a third voltage higher than the first voltage, a third advance angle larger than the first advance angle is set as the advance angle.

5. The motor drive device according to claim 1, wherein
the inverter includes a plurality of switching elements, and
at least one of the plurality of switching elements is formed of a wide band gap semiconductor.

6. The motor drive device according to claim 5, wherein the wide band gap semiconductor is silicon carbide, gallium nitride, or diamond.

7. An electric blower comprising the motor drive device according to claim 1.

8. An electric vacuum cleaner comprising the electric blower according to claim 7.

9. A hand dryer comprising the electric blower according to claim 7.

* * * * *